3,426,608
INSTANTANEOUS SPEED SHIFT
GEAR MECHANISM
Eugene F. Loughran, Oakville, and Joseph J. Balnis, Waterbury, Conn., assignors to Consolidated Electronics Industries Corporation
Filed Mar. 31, 1967, Ser. No. 627,469
U.S. Cl. 74—393       9 Claims
Int. Cl. F16h 17/08; H01h 43/00

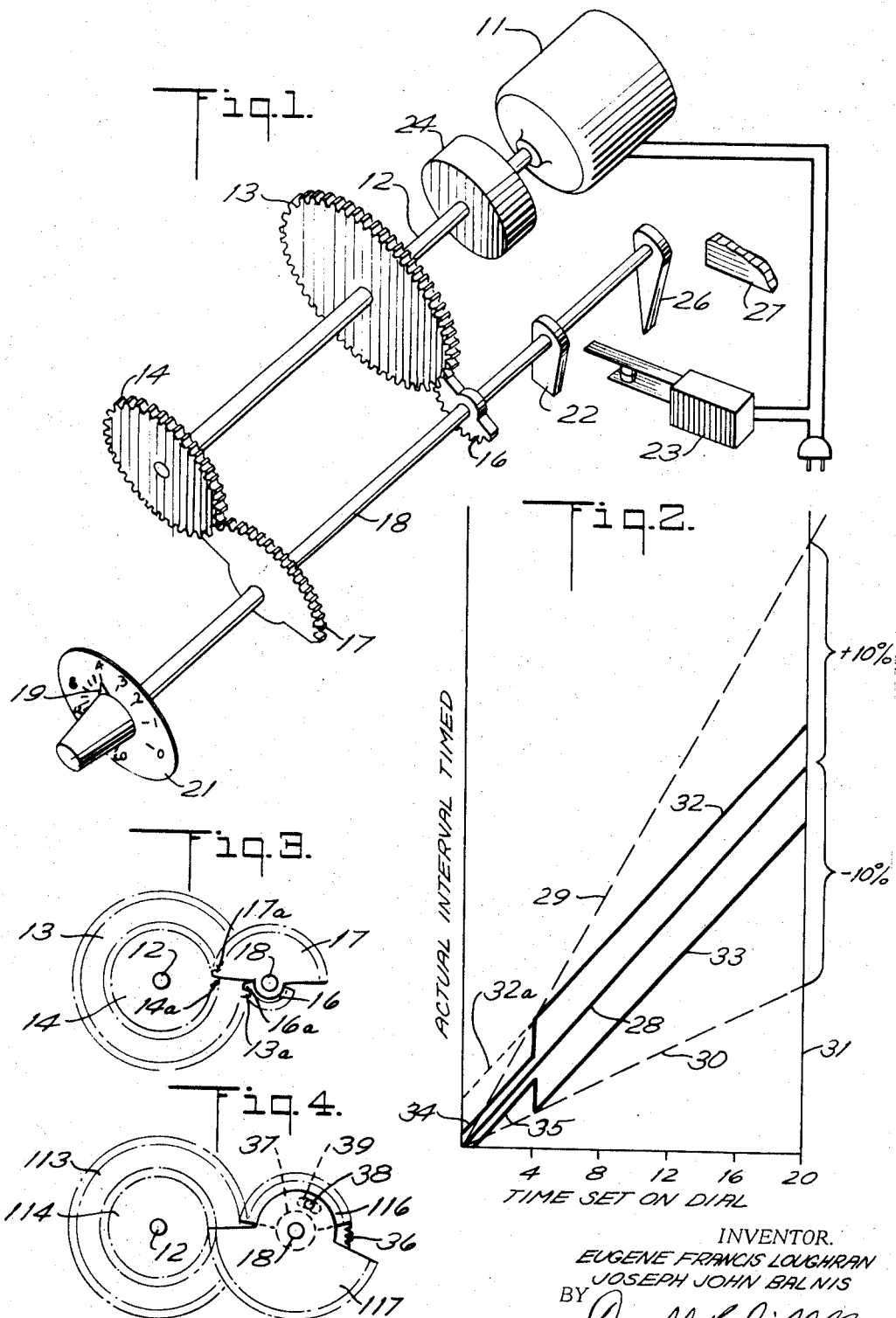

ABSTRACT OF THE DISCLOSURE

This invention is a gear transmission system with two gears of different diameter meshable, respectively, with two segment gears to provide two different transmission ratios. The effective angular relation between the segment gears is such that there is smooth but positive transfer of power from one gear and segment gear meshing pair at one transmission ratio to the other gear and segment gear meshing pair at the other transmission ratio.

---

This invention relates to a gear transmission system which is particularly adapted for use in timing apparatus and in which the transmission ratio varies substantially instantaneously from one value to a different value while the transmission is operating.

In timing apparatus it is frequently desirable to have the accuracy of the interval being timed stay within a fixed maximum amount whether the interval be long or short. In the case of timing mechanisms in which a synchronous motor is used as the basic time-determining factor, the exact time that will be taken in having the motor rotate through a prescribed angle is basically a function of the angle but is also subject to a variation which is not a function of the angle but is a constant for any angle. For example many timers comprise a dial which is set to a desired time and then released. A timing motor drives the dial back to a zero setting point where a switch is actuated to indicate the end of the timed interval. If it be assumed that the motor operates at the proper speed, the only source of inaccuracy in the interval is in the precision with which the angle is determined, which is controlled by the accuracy at which the initial setting is made and by the discrepancy, if any, between the supposed zero point and the actuation of the switch. If the accuracy of measurement of the angle is no better than one degree, the total duration of the time required to return the dial to a zero point will be inaccurate to the extent that one degree is a fraction of the total angle through which the dial must be driven. In the case of a dial that must be driven 330°, which is a common maximum amount, one degree is a very small fraction and will have an almost negligible effect on the total time required to traverse the entire 330°. If, however, the angle is only 10°, the possible inaccuracy of one degree is ten percent of the total desired time, and if the initial angle is only one degree, the possible inaccuracy is one hundred percent.

In many types of apparatus it is essential that the inaccuracy of the total time required to return a dial pointer to zero be held below a fixed percentage for any setting of the timer between its maximum and minimum points. One such apparatus, which is merely cited for illustrative purposes and forms no basic part of the present invention, is a so-called radar cooker that may be required to cook one type of food for only a minute but another type of food for twenty minutes. If there is a potential inaccuracy of half a minute for any setting of the timer, due to the setting of the timer, the food that is to be cooked for twenty minutes will probably not be seriously affected by being cooked either nineteen and a half or twenty and a half minutes but the food that is to be cooked one minute may be quite badly burned if cooked a minute and a half or almost cold if cooked only thirty seconds.

The possible error at the zero end of the timed interval can arise because the switch that is to be actuated when the timer indicator reaches zero may be slightly misplaced or the actuating mechanism may be misplaced or parts may be worn. Any of these errors will have the same effect whether the timed interval is to be a very short one or a very long one; they will not be a function of the time interval itself. A typical allowable magnitude of such errors is 1.6% of the maximum time interval, and it should be noted that, although the error is stated in terms of a percentage, it is a percentage of a fixed interval, the maximum interval. For a timer having a maximum timed interval of twenty minutes, a 1.6% error would mean an error of about eighteen seconds. An eighteen-second error would be an increasingly larger percentage error the shorter the timed interval.

The numerical magnitude of the error whether 1.6% or some other figure is at least implicitly based upon the speed with which the timing mechanism operates. Since the end of the timed interval is usually indicated by the actuation of a switch, the possible error in the exact instant that the switch operates will be less if the switch is actuated rapidly than if it is actuated slowly, but the advantage of actuating the switch rapidly is limited by the total available movement of the actuating mechanism. If the total movement of the timing member is 330° and this angle is to be traversed in twenty minutes, the effective angular velocity is 16.6°/min. Assuming again that a switch is to be operated at the end of this interval and that the exact time of operation of the switch is to be within 1.6% of the maximum time, or about eighteen seconds, the switch will be actuated within the last 5°, which is the angle through which the timing member will move in eighteen seconds at an angular velocity of 16.5°/min. If the angular velocity could be increased by a known amount for short timed intervals, the final 5° could be traversed more quickly and the percentage error for short time intervals reduced.

It is one of the objects of the present invention to provide a timer apparatus in which the operating speed of the actuator can be increased by a known amount at a known time to reduce the effective error in the time interval, particularly for short intervals.

In order to carry out the foregoing object, a gear mechanism is provided to drive an indicator across a dial face to indicate the passage of time. The timer may include standard elements, but the dial face is divided into at least two parts, one of which is enlarged, or expanded, with respect to another. In order to move the indicator across the expanded part of the scale at a faster rate than across the other part, the usual output shaft of the timer is provided with two gears, or gear segments, of different pitch diameters to mesh with two other gears or segments on a second shaft, the difference in pitch diameters being determined by the speed change desired in the speed of the indicator. The indicator itself is connected to the second shaft and the different parts of the dial are located adjacent to each other so that the indicator is opposite the transition point on the dial scale at a position corresponding to the transition of power transmission from one set of gears to the other.

A further object of the invention and a more basic object insofar as the transmission itself is concerned is to provide a gear transmission mechanism which will be in the mesh at all times but which will be capable of shifting the transmission ratio substantially instantaneously at least once during the rotation of the transmission from one of its extremes to another, or at least twice in each revolution of the input shaft if the transmission operates on a continuous basis. A still further object of the invention is to provide a multi-speed gear transmission in which a different ratio is engaged at an intermediate operating point of the transmission but substantially without any overlap between the operating sets of gears so that at no time will the transmission be in a self-contradictory condition of attempting to operate simultaneously with two transmission ratios.

Further objects will become apparent from the following specification together with the drawings, in which:

FIG. 1 is a perspective schematic view of a timer including a gear transmission system constructed according to the invention;

FIG. 2 is a graph indicating the accuracy of operation of the apparatus in FIG. 1;

FIG. 3 shows the angular relationship between segment gears of the transmission in FIG. 1; and FIG. 4 is a modified form of the transmission shown in FIG. 1.

FIG. 1 is a simplified diagrammatic view of a timer comprising a constant-speed motor 11 driving a shaft 12 on which are mounted two gears 13 and 14. The gear 13 engages a segment gear 16 as a first meshing pair, while the gear 14 meshes with another segment gear 17 as a second meshing pair. The segment gears 16 and 17 are both mounted on a second shaft 18 which, in this simplified embodiment, is connected to an indicator pointer 19 that indicates time intervals on a dial 21. The indicator is aligned with an arm 22 that actuates a switch 23, usually located in such a position as to be actuated when the indicator reaches a zero position on the dial 21. The embodiment shown in this figure includes additional features frequently found desirable in this system, such as a friction clutch 24 and a stop arm 26 that engages an abutment 27 when the indicator 19 is set to the maximum permissible time interval.

The timer of FIG. 1 is operated by setting the indicator 19 with respect to the dial 21 to any desired time within the maximum limits of the device. In the specific embodiment shown the maximum time is twenty minutes and the setting of the indicator 19 at any interval up to twenty minutes causes the shaft 18 to be rotated counter-clockwise, thereby rotating both the segment gears 16 and 17. These gears, operating through their meshing gears 13 and 14, respectively, rotate the shaft 12 clockwise. Normally the motor 11 has a built-in gear reduction which would make it difficult to rotate the rotor and this is one of the reasons for providing the clutch 24, which is capable of slipping either when the shaft 12 is rotated clockwise or when it is prevented from rotating counter-clockwise at a time when the motor 11 rotates.

As the shaft 18 is rotated clockwise to set the timer, the arm 22 also rotates clockwise away from the position in which it actuates the switch 23. This switch is of the normally-closed type so that when the arm 22 moves away from it, the switch turns on the motor. As soon as the indicator 19 is released, the motor can immediately start driving it back to the zero setting position. The clutch 24 prevents the torque of the motor from interfering with or even make difficult the setting of the indicator 19. As the motor operates, it rotates the shaft 12 and the gear 13 and 14 connected to it clockwise. Depending upon the position to which the indicator 19 was set, either the segment gear 16 or the segment gears 17 and 16 in sequence will be driven counter-clockwise by the gears 13 and 14 with which they mesh. This counter-clockwise rotation of the segment gears 16 and 17 during the timing out interval causes the shaft 18 to rotate counter-clockwise carrying with it the indicator 19 and the arm 22. When the indicator 19 reaches the zero position on the dial 21, the arm 22 actuates the switch 23 which turns off the motor 11 and stops any further rotation of the shaft 18. While the shaft 12 may be considered to be the input shaft and the shaft 18 considered to be the output shaft since the shaft 12 is driven by the motor 11 during the timing out part of the cycle, this designation is obviously not limiting since during the setting of the timer, the shaft 18 drives the shaft 12 by way of the meshing gear pairs.

It will be noted that the segment gears 16 and 17 are angularly oriented with respect to each other on the shaft 18 so that they do not both engage their respective gears 13 and 14 for an overlapping interval of time, although it is essential that there be a driving connection between the shaft 12 and the shaft 18 through one or the other of the gears 16 and 17 at every instant of time in order that there be a positive connection between the position of the rotating element of the timer motor 11 and the indicator arm 19.

To make the description more concrete, it will be assumed that the total angle through which the indicator 19 of FIG. 1 moves is 330°, which is a common maximum angle for potentiometers and certain other electrical components. This total angle of 330° is divided into two equal segments of 165°, and in this embodiment, in accordance with the relationships depicted in FIG. 2, it is desired that the indicator 19 traverse one of the 165° angular segments in sixteen minutes and the other 165° angular segment in only four minutes, a speed ratio of 4:1.

The 4:1 difference in angular speed of the indicator 19 may be accommodated if the ratio between gear 13 and the segment 16 differs from the ratio between gear 14 and the segment 17 by 4:1. This may be done in several different ways. In the mechanism illustrated in FIG. 1 the necessary 4:1 speed change is achieved by means of a 1:1 ratio between the gears 14 and 17 and a 1:4 ratio between the gears 13 and 16. The same speed change could also be accomplished if the gears 14 and 17 had a set-up ratio of 2:1 and the gears 13 and 16 a step-down ratio of 1:2. All of these ratios are merely illustrative; in a particular apparatus different ratios might be required, either to step up the speed of the shaft 18 or to step it down, and the ratio of the faster speed to the slower speed might also be different.

FIG. 2 is a graph that shows the relationship between the true time interval of the timer and a time interval for which the apparatus is apparently adjusted. Under ideal conditions and with no inaccuracy in the setting of the indicator 19 or the placement of the switch 23, the actual time interval would be a linear function of the time interval for which the timer was set, as indicated by the sloping line 28 passing through the origin of the graph. Since it must be assumed that the apparatus has some possible inaccuracies, the lines 29 and 30 indicate a permissible and typical tolerance value of ±10% of the desired value. That is, for any desired time interval to which the apparatus was supposedly set, the actual interval timed would be within ±10% of the nominal value. The tolerance would be proportional to the interval and thus the lines 19 and 30 are straight lines that pass through the origin of the graph. A timer that operates within the triangular area bounded by the lines 29 and 30 and the maximum time limit of the timer, as indicated by the vertical line 31, is, by definition, operating satisfactorily.

While there are timers that do function in this way, the timer of the present invention operates in a different fashion. As has been explained, the inaccuracy to be expected in this type of timer is not a function of the particular time interval but is a fixed amount, although it has been expressed as a percentage of the maximum time interval. Thus the timer of the present invention would operate in a band spaced from the desired line 28 by a distance that would be fixed and would not be farther away than the sloping lines 32 and 33, which are parallel to the line 28. As may be seen, for relatively large time intervals, the accuracy of this type of apparatus is better than that of a timer in which the inaccuracy is a fixed percentage of the time interval for which it happens to be set. However, for small intervals of time, the line 32, carried far enough to the left, crosses the line 29 and thereafter lies above it as indicated by the dotted section 32a, while the line 33 crosses the line 30. This indicates that, for small time intervals, this type of timer is less accurate than would be desired. It has been calculated that for a timer having a nominal maximum of twenty minutes, the lines 32 and 33 based upon a discrepancy of 1.6% of the twenty minute interval would cross the lines 29 and 30 based upon a constant 10% tolerance at a value of 3.7 minutes.

In accordance with the present invention the gear transmission system is set to change the speed of operation of the indicator 19 at a time interval slightly greater than 3.7 minutes and in fact at a time interval of 4 minutes. The change of transmission ratio to a higher speed at four minutes results in displacing the lines 32 and 33 parallel to themselves but closer to the line 28 to positions indicated by the lines 34 and 35. While these lines also eventually cross the lines 29 and 30, they do so at a very small indicated time interval which is of no practical significance and is much lower than the 3.7 minute figure that would be applicable if the transmission ratio were kept constant. If necessary, to accommodate accurate timing of very short intervals, another gear and gear sector of still greater ratio could be added to the shafts 12 and 18.

It is of the utmost importance that the transmission of power from the shaft 12 to that shaft 18 be transferred smoothly from the gear pair 14 and 17 to the gear pair 13 and 16 at the time marked four minutes on the dial 21, since, in the present embodiment, the four-minute mark has been chosen at the point at which the speed ratio changes. There must not be a gap in the transmission of power from the shaft 12 to that shaft 18, nor from the shaft 18 to the shaft 12 when the timer is being set, between the time that power is transmitted via the gears 14 and 17 and the time that the gears 13 and 16 take up the transmission of power. On the other hand there must be no overlapping interval of time when any attempt is made to transmit power from the shaft 12 to the shaft 18 through both gear pair 14 and 17 and the gear pair 13 and 16 since any such overlap would lock the mechanism.

FIG. 3 shows a layout of the gears 13, 14, 16 and 17 but only the critical teeth in each of these gears is shown. These are tooth 13a on the gear 13, tooth 14a on the gear 14, tooth 16a at the end of the segment gear 16 and tooth 17a at the end of the segment gear 17. During the timing-out operation, the gears 13 and 14 rotate counter-clockwise in the direction of the arrows 31 and at the critical moment of transfer of the meshing condition from gears 14 and 17 to the gears 13 and 16, the tooth 17a is the last tooth of the segment gear 17 to engage any of the teeth of the gear 14 and the tooth thus engaged is the tooth 14a. As the sets of gears rotate to the position where the tooth 14a just leaves contact with the tooth 17a, the tooth 13a of the gear 13 must move into position where it begins to make contact with and to apply pressure to tooth 16a. The angle through which a pair of gears turns from the instant of contact between a particular tooth on one gear and a particular tooth on the other gear to the point at which these teeth are making contact on the pitch point, or at the pitch diameters of the gears, is called the angle of approach. The angle through which a pair of gears turns as the point of contact between a particular tooth on each of the gears moves from the pitch point to the point at which the teeth separate from each other is known as the angle of recess. Therefore, if lines joining the centers of the shaft 18 to the teeth 16a and 17a are separated by a total angle equal ot the approach angle of the tooth 16a plus the recess angle of the tooth 17a, and assuming that teeth are involute teeth, the transmission of power can be transferred from the gear pair 14 and 17 to the gear pair 13 and 16 without any interference and without losing mesh.

FIG. 4 shows a modified form of construction where the proper recess and approach angles cannot be accommodated, as for example, where a small change of speed may be desired. Numerically, a difference of less than about 2:1 between the ratio of the gears 13 and 16 and the gears 14 and 17 would cause trouble. More precisely, interference would occur when the angle of approach of the gear 16 is less than the angle of recess of the gear 17 so that the root of one engaged pair would still be engaged when the tip of the incoming gear of the other pair engages. In this case there is less difference betwen the radii of the gears 113 and 114 than there is between the corresponding gears 13 and 14 of FIG. 3, and there is also less difference between the radii of the segment gears 116 and 117 than there is between the corresponding segment gears 16 and 17 of FIG. 3. If the sizes of the gears are such that the proper angle of separation cannot be provided, and yet there must be smooth transfer of power from one set of gears to the other without any position in which all of the gears are out of mesh, the gears 116 and 117, instead of both being mounted rigidly on the shaft 18, may be connected together by a spring 36. One of the gear segments, for example the segment 116, may be rigidly attached to the shaft 18 and may be provided with a cylindrical shoulder 37 on which the segment 117 is rotatably mounted. The segment 117 has a pin 38 that extends parallel to the axis of the shaft 18 and through a slot 39 concentric with the shaft 18 and having a maximum angular dimension sufficient to permit the gear 117 to shift with respect to the segment 116 sufficiently to accommodate the interference that would otherwise occur. As a result, even when both the segment gears 116 and 117 are in mesh at the same time with their respective gears 113 and 114, the shaft 18 will only be driven by one of the segment gears, for example the segment gear 116, until that segment clears its corresponding gear 113. During this time, the segment gear 117 rotates with respect to the segment gear 116, but as soon as the segment gear 116 is free of the gear 113, the spring 36 transmits force from the segment gear 117 to the shaft 18 by way of the segment gear 116. The pin 38 and the slot 39 prevent too great a movement of the segment 117 with respect to the segment 116.

While this invention has been described in terms of specific embodiments, it will be understood by those skilled in the art that modifications may be made therein within the scope of the following claims.

What is claimed is:

1. A gear transmission system comprising: a first and second shaft; a first gear and a second gear rigidly attached to said first shaft to rotate therewith; a third gear; and a fourth gear rigidly attached to said second shaft to rotate therewith, said first gear being engageable with said third gear as a first meshing pair and said second gear being engagable with said fourth gear as a second meshing pair, one of the gears of said first meshing pair being a first segment gear and having a last tooth and one of the gears of said second meshing pair being a second segment gear and having a first tooth angularly displaced from said last tooth by an angle substantially equal to the recess angle of said first segment gear plus the approach angle of said second segment gear so that said last tooth on said first segment gear disengages from the other gear of said first meshing pair as said first tooth on said second segment gear moves into mesh with the other gear of said second meshing pair whereby one of said meshing pairs will be in mesh throughout the transition of mesh from said first meshing pair to said second meshing pair.

2. The gear transmission of claim 1 in which all of the teeth of all of said gears are involute teeth.

3. The gear transmission of claim 1 in which said first and second shafts are parallel to each other.

4. The gear transmission of claim 1 in which the ratio of the pitch diameter of said first gear to the pitch diameter of said third gear is different from the ratio of the pitch diameter of said second gear to the pitch diameter of said fourth gear.

5. A gear transmission system comprising: a first and second shaft; a first gear and a second gear attached to said first shaft to rotate therewith; a first segment gear rigidly attached to said second shaft; a second segment gear pivotally attached to said second shaft to rotate therewith, said first gear being engageable with said first segment gear as a first meshing pair and said second gear being engagable with said second segment gear as a second meshing pair; and a spring resiliently linking said first segment gear to said second segment gear to urge said first and second segment gears normally into position such that a last tooth on said first segment gear disengages from said first gear as a first tooth on said second segment gear moves into mesh with said second gear, whereby one of said meshing pairs will be in mesh throughout the transition of mesh from said first meshing pair to said second meshing pair.

6. The gear transmission of claim 5 in which the transmission ratio of said first meshing pair is sufficiently close to the transmission ratio of said second meshing pair so that the angle of recess of a gear in said first meshing pair is less than the angle of approach in said second meshing pair.

7. The gear transmission of claim 5 in which the ratio of the transmission of said first meshing pair to the transmission ratio of said second meshing pair is less than approximately 2:1.

8. The gear transmission of claim 5 comprising, in addition: a pin and slot connection between said third and fourth gears to limit the maximum excursion of said third gear with respect to said fourth gear.

9. A timer mechanism comprising: a motor; a clutch connected to said motor to be driven thereby and capable of slipping under excess torque; a first shaft connected to said clutch to be driven thereby; first and second gears connected to said shaft to rotate therewith; a second shaft; third and fourth gears mounted on said second shaft to rotate therewith and meshable, respectively, with said first and second gears, said first and third gears forming a first meshing pair and said second and fourth gears forming a second meshing pair, the ratio of the pitch diameter of said first gear to said third gear being different from the ratio of the pitch diameter of said second gear to said fourth gear; a dial member and an indicator member capable of relative movement with respect to each other, one of said members being connected to said second shaft to be moved thereby; a switch connected mechanically to said second shaft to be actuated thereby; means to move the one of said members connected to a second shaft to a preset position whereby said second shaft is rotated and said switch is actuated to energize said motor, said third and fourth gears being segment gears angularly disposed on said second shaft in nonoverlapping relationship, said third gear having a last tooth at one end thereof and said fourth gear having a first tooth at the other end thereof, said last tooth and said first tooth being arcuately displaced by an angle substantially equal to the sum of the recess angle of said last tooth and the approach angle of said first tooth whereby one and only one of said meshing pairs is in engagement at all times.

References Cited

UNITED STATES PATENTS

| | | | |
|---|---|---|---|
| 1,604,563 | 10/1926 | Brown | 74—437 X |
| 2,261,723 | 11/1941 | Hoffman | 74—393 X |
| 2,956,445 | 10/1960 | Janoska | 74—435 X |
| 3,218,966 | 11/1965 | Petit | 74—437 X |

FOREIGN PATENTS 743,453   1/1956   Great Britain.

DONLEY J. STOCKING, *Primary Examiner.*

LEONARD H. GERIN, *Assistant Examiner.*

U.S. Cl. X.R.

74—435, 437; 200—35